United States Patent
Nakamura et al.

(10) Patent No.: US 8,120,728 B2
(45) Date of Patent: Feb. 21, 2012

(54) POLARIZING PLATE AND LIQUID CRYSTAL DISPLAY DEVICE USING THE SAME

(75) Inventors: Ryo Nakamura, Minami-ashigara (JP); Hiroshi Takeuchi, Minami-ashigara (JP); Mitsuyoshi Ichihashi, Minami-ashigara (JP); Yukito Saitoh, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 415 days.

(21) Appl. No.: 12/493,746

(22) Filed: Jun. 29, 2009

(65) Prior Publication Data

US 2010/0014029 A1 Jan. 21, 2010

(30) Foreign Application Priority Data

Jun. 30, 2008 (JP) .................. 2008-170204

(51) Int. Cl.
*G02F 1/1335* (2006.01)
(52) U.S. Cl. ........................................................ 349/96
(58) Field of Classification Search ........................ None
See application file for complete search history.

(56) References Cited

U.S. PATENT DOCUMENTS

| | | | |
|---|---|---|---|
| 2001/0029638 A1* | 10/2001 | Bobrov et al. | 8/506 |
| 2005/0196550 A1* | 9/2005 | Lazarev et al. | 428/1.1 |
| 2006/0114384 A1* | 6/2006 | Yeh et al. | 349/117 |
| 2009/0195733 A1* | 8/2009 | Saitoh | 349/96 |

FOREIGN PATENT DOCUMENTS

| | | |
|---|---|---|
| JP | 10-268294 A | 10/1998 |
| JP | 2001-350022 A | 12/2001 |
| JP | 2003-524207 A | 8/2003 |
| JP | 2007-233162 A | 9/2007 |

* cited by examiner

*Primary Examiner* — Wen-Ying P Chen
(74) *Attorney, Agent, or Firm* — Buchanan Ingersoll & Rooney PC

(57) ABSTRACT

The invention relates to a polarizing plate comprising at least a polarizing layer having a K value as defined by the following expression of from 0.25 to 0.75;

$$K=(kx-kz)/(kx-ky)$$

wherein axes which are orthogonal to each other in a plane of the polarizing layer are an x-axis and a y-axis; an axis which is orthogonal to an x-y axis plane is a z-axis; and kx, ky and kz are an absorption coefficient along the x-axis, y-axis and z-axis directions, respectively.

13 Claims, 1 Drawing Sheet

POLARIZING PLATE AND LIQUID CRYSTAL DISPLAY DEVICE USING THE SAME

CROSS-REFERENCE TO RELATED APPLICATIONS

This application claims benefit of priority under 35 U.S.C. 119 to Japanese Patent Application No. 2008-170204 filed on Jun. 30, 2008, which is expressly incorporated herein by reference in its entirety.

BACKGROUND OF THE INVENTION

1. Technical Field

The present invention belongs to a technical field for improving a polarizing plate in terms of wide viewing angle characteristics, and specifically relates to a wide viewing angle polarizing plate and a liquid crystal display device using the same.

2. Background Art

In a transmission liquid crystal display device, in general, a pair of polarizing plates is used and disposed so that their polarization axes are orthogonal to each other. However, even when the two polarizing plates are superimposed in such a manner that a crossing angle of the polarization axes is orthogonal, the resulting liquid crystal display device is deviated from orthogonality against incident light from the oblique direction. This is a factor of causing light leakage in the oblique direction in the black state. Accordingly, for the purpose of providing a liquid crystal display device with excellent viewing angle characteristics, it is important to reduce the viewing angle dependency of a polarizing plate. As a wide viewing angle polarizing plate, there have hitherto been made various proposals to combine a polarizer with a retardation layer exhibiting prescribed optical characteristics (see JP-A-2001-350022). Also, it has also been proposed to utilize a polarizer whose refractive index in the transmission axis direction falls within a prescribed range (see JP-A-10-268294).

Also, there is proposed a dichroic polarizer in which absorption anisotropy and refractive index anisotropy are satisfied with a prescribed relation (see JP-T-2003-524207).

Also, there is proposed a polarizing plate having a polarizing layer, including a region where a dichromatic function unit (i.e. dichromatic dye) is subjected to orientation control by having an angle of inclination with a polarizing plate surface. (see JP-A-2007-233162).

SUMMARY OF THE INVENTION

An object of the invention is to provide a novel wide viewing angle polarizing plate and a liquid crystal display device with improved viewing angle characteristics using the same.

The means for achieving the object is as follows.

[1] A polarizing plate comprising at least a polarizing layer having a K value as defined by the following expression of from 0.25 to 0.75;

$$K=(kx-kz)/(kx-ky)$$

wherein axes which are orthogonal to each other in a plane of the polarizing layer are an x-axis and a y-axis; an axis which is orthogonal to an x-y axis plane is a z-axis; and kx, ky and kz are an absorption coefficient along the x-axis, y-axis and z-axis directions, respectively.

[2] The polarizing plate according to [1], having a degree of polarization of 99% or more.

[3] The polarizing plate according to claim [1] or [2], wherein the polarizing layer has kx·d of from 0.1 to 1 μm and kz·d of from 0.02 to 0.8 μm, wherein d represents a thickness of the polarizing layer.

[4] The polarizing plate according to any one of [1] to [3], wherein the polarizing layer is formed of a liquid crystal composition comprising at least one kind of liquid crystalline compound and at least one kind of dichroic dye.

[5] The polarizing plate according to any one of [1] to [4], wherein the polarizing layer formed of a liquid crystalline composition comprising at least one kind of liquid crystalline compound having positive optical anisotropy, at least one kind of liquid crystalline compound having negative optical anisotropy and at least one kind of dichroic dye.

[6] The polarizing plate according to [5], wherein said at least one kind of liquid crystalline compound having positive optical anisotropy is a rod-like liquid crystalline compound; and said at least one kind of liquid crystalline compound having negative optical anisotropy is a discotic liquid crystalline compound.

[7] The polarizing plate according to [6], wherein, in the polarizing layer, molecules of the rod-like liquid crystalline compound are fixed so that their long axes are parallel to the layer plane; and, in the polarizing layer, molecules of the discotic liquid crystalline compound are fixed so that their disk planes are vertical to the layer plane.

[8] The polarizing plate according to [4], wherein the polarizing layer is a layer of a fixed optically biaxial liquid crystalline phase.

[9] The polarizing plate according to [4], wherein the polarizing layer is a layer of a fixed biaxial smectic liquid crystalline phase.

[10] The polarizing plate according to [4], wherein the polarizing layer is a layer of a fixed chiral smectic C phase or antiferroelectric liquid crystalline phase (SmCA*).

[11] The polarizing plate according to any one of [4] to [10], wherein the polarizing layer is a single layer of the liquid crystalline composition fixed in an alignment state.

[12] The polarizing plate according to [10] or [11], wherein the liquid crystalline composition comprises an aligning agent capable of increasing a tilt angle of molecules of the liquid crystal compound.

[13] A liquid crystal display device comprising at least a liquid crystal cell and the polarizing plate according to any one of [1] to [12].

Figure 1:
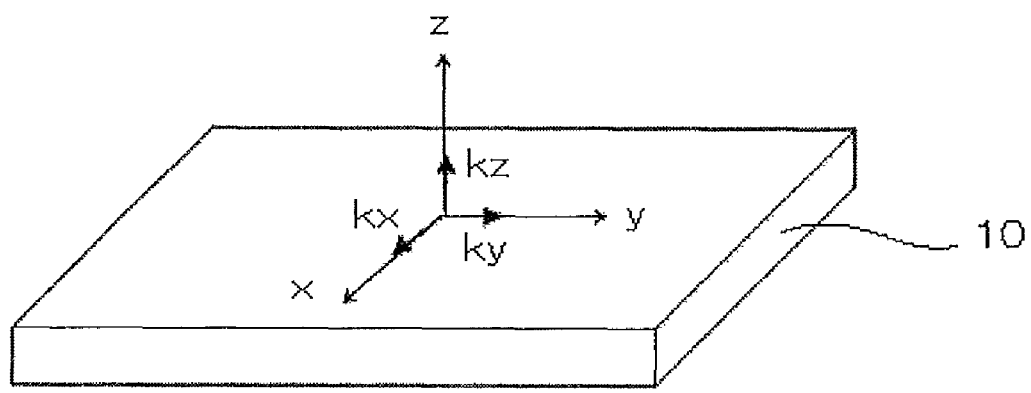
FIG. 1 is a perspective view of a polarizing plate which is used for explaining an absorption coefficient of the polarizing plate of the invention.

A symbol in FIG. 1 is as follows.

10: Polarizing film

PREFERRED EMBODIMENT OF THE INVENTION

The invention is hereunder described in detail. In this specification, numerical value ranges expressed by the term "to" mean that the numerical values described before and after it are included as a lower limit and an upper limit, respectively.

Also, in this specification, a wavelength λ nm in a visible light region is 550 nm unless otherwise indicated; and values of a refractive index and an absorption coefficient are represented by values at a wavelength of 550 nm unless otherwise indicated.

The invention relates to a polarizing plate having a polarizing layer having a K value as defined by the following expression of from 0.25 to 0.75.

$$K=(kx-kz)/(kx-ky)$$

As shown in FIG. 1, axes which are orthogonal to each other in a plane of the polarizing layer are an x-axis and a y-axis; an axis which is orthogonal to an x-y axis plane is a z-axis; and kx, ky and kz are an absorption coefficient along the x-axis, y-axis and z-axis directions, respectively.

The absorption coefficient in the fixed direction of the polarizing layer can be calculated from a value measured by a spectrophotometer such as Shimadzu's automatic recording spectrophotometer UV3100. Specifically, a single transmittance Ts, a parallel transmittance Tp in case of superimposing two polarizers while making their absorption axes in conformity with each other and a crossed transmittance Tc in case of superimposing two polarizers while making their absorption axes orthogonal to each other can be determined by this instrument; and a transmittance Ta in the absorption axis direction of the polarizing layer and a transmittance Tt in the transmission axis direction of the polarizing layer can be calculated from these values.

$$Tp=Ta^2+Tt^2$$

$$Tc=2Ta\times Tt$$

By measuring a thickness d of the polarizing layer according to a method employing cross-sectional SEM, an absorption coefficient k can be obtained from these transmittances according to the following expression.

$$k=-\log(T)\times\lambda/(4\pi d)$$

Also, a degree of polarization P is defined as a value calculated according to the following expression.

$$\text{Degree of polarization } P=[(Tp-Tc)/(Tp+Tc)]^{1/2}\times 100$$

An absorption coefficient along the thickness direction can be obtained by measuring a transmittance in the direction defined as an angle of, for example, a polar angle of 40 degrees and fitting it to a theoretical expression similarly using the foregoing expression while taking into consideration the Snell's expression or Fresnel's expression.

A general absorption type polarizer which is used in a liquid crystal display device has a function to absorb light having a vibrating direction of one direction and convert it to light having a vibrating direction of an orthogonal direction thereto, namely linearly polarized light. It is general that an absorption axis and a transmission axis which is orthogonal thereto are present in a plane thereof and that the absorption axis is an optical axis direction called in a uniaxial birefringent body. In other words, it is general that a relation of kx>ky=kz is satisfied, and K is substantially 1. When light is made incident from a position deviated by an azimuth angle θ (θ≠0) from the transmission axis of this conventional absorption type polarizer, the polarizing state of outgoing light becomes linearly polarization inclined by θ±α. Light leakage is caused in the oblique direction at the time of crossed Nicols. As a result of extensive and intensive investigations made by the present inventor, there was obtained knowledge that by regulating K at a small value as less than 1, this α can be made small. As a result of further investigations on the basis of this knowledge, it has been found that when K is from 0.25 to 0.75, light leakage in the off-axis direction (azimuth angle direction other than the absorption axis and transmission axis of the polarizer) at the time of crossed Nicols can be reduced.

In view of the fact that the effects to be brought due to the foregoing mechanism are enhanced, K of the polarizing layer is preferably equal to or more than 0.3, and more preferably equal to or more than 0.4. Also, K is preferably equal to less than 0.7, and more preferably equal to or less than 0.6.

In the polarizing layer, K falls within the foregoing range, and a relation of kx>kz>ky is at least satisfied. That is, in the polarizing layer according to the invention, the absorption coefficient along the x-axis direction as an arbitrary direction in the plane is the maximum, and this point of view is the same as in a generally used absorption type polarizer. However, the polarizing layer according to the invention is characterized in that the absorption coefficient kz in the z-axis direction (thickness direction) is larger than the absorption coefficient ky in the y-axis direction and is different in this point of view from that in the generally used absorption type polarizer. A polarizing plate having the polarizing layer having such characteristic features has a tendency that its polarizing ability is lowered as compared with a polarizing plate having a general absorption type polarizer with K of about 1. The degree of polarization is one of indexes indicating the polarizing ability of a polarizing plate; and a polarizing plate to be utilized for liquid crystal display devices is required to have a degree of polarization of 99% or more (more preferably 99.9% or more). In order to achieve a degree of polarization of 99% or more while achieving the effects of the invention to be obtained due to the foregoing mechanism, it is preferable that kx·d is from about 0.1 to 1 μm, ky·d is from about 0.001 to 0.01 μm, and kz·d is from about 0.02 to 0.8 μm. Also, the thickness d is preferably from 0.5 to 30 μm (more preferably from 0.7 to 20 μm). However, it should not be construed that the invention is limited to these ranges. The preferred range of the degree of polarization will vary depending upon applications and the like, and the preferred ranges of these absorption coefficients will vary in response thereto.

In case of using a polarizing plate for display devices such as liquid crystal display devices, it is important that the polarizing plate does not impair brightness. Accordingly, in such an application, it is important that not only a transmittance at an orthogonal array (in the black state) but a ratio of a white transmittance at a parallel array to a black transmittance at an orthogonal array, which is a so-called contrast ratio (white transmittance/black transmittance), is high. In order to achieve a contrast ratio of 1,000 or more, the degree of polarization is preferably 99.99% or more.

The polarizing plate of the invention may have a support for supporting the polarizing layer and/or a protective film for protecting its surface. In an embodiment in which the polarizing layer is formed through a coating step as described later, a coating fluid for forming a polarizing layer may be applied to the surface of the support such as a polymer film. Also, for the purpose of improving durability of the polarizing layer, it is preferable that a protective film is stuck on the surface of the polarizing layer. Also, the polarizing plate of the invention may further have a layer which has hitherto been utilized as a functional layer of a polarizing plate, such as an antireflection layer, an antistatic layer and a brightness enhancing layer. The polarizing plate of the invention may further have a birefringent layer for optical compensation of a liquid crystal display device so far as the effects of the invention are not impaired. The support of the polarizing layer and/or the protective film of the polarizing layer, which is a part of the polarizing plate of the invention, may play a role as such a functional layer.

A method for preparing the polarizing plate of the invention and materials which can be utilized therefor and the like are hereunder described in detail.

The polarizing layer whose K is satisfied with the foregoing condition can be prepared by utilizing a dichroic dye. The dichroic dye is a dye having anisotropy in an absorptive ability of light in a visible light region and can be classified into a dye having a rod-like molecular shape and a dye having a disc-like (discotic) molecular shape. All of these dyes may be used in preparing the polarizing layer. Examples of the dichroic dye having a rod-like molecular structure include azo dyes, anthraquinone dyes, perylene dyes, mericyanine dyes and anthraxin dyes. Examples of the azo dyes include those disclosed in JP-A-11-172252; examples of the anthraquinone dyes include those disclosed in JP-A-8-67822; examples of the perylene dyes include those disclosed in JP-A-62-129380; examples of the mericyanine dyes include those disclosed in JP-A-2002-241758; and examples of the anthraxin dyes include those disclosed in WO 03/014259. These dyes may be used singly or in combinations of two or more kinds thereof.

Examples of the dichroic dye having a disc-like molecule include dichroic dyes which are used in an "E-Type polarizer" as a polarizer using a lyotropic liquid crystal, as represented by those of OPTIVA Inc. More specifically, materials disclosed in JP-A-2002-90547 are exemplified. Also, there is an example using a bis-azo based dichroic dye which utilizes a worm-like micelle type structure as a chemical structure of similarly absorbing light in a disc-like form, and materials disclosed in JP-A-2002-90526 are exemplified. These materials may be used singly or in combinations of two or more kinds thereof.

Though a hue of the dichroic dye to be used is not particularly limited, for the purpose of obtaining high polarizing ability, it is preferred to utilize a dichroic dye with a black hue. Two or more kinds of dichroic dyes may be utilized, and two or more kinds of dichroic dyes having a different hue from each other may be utilized.

For example, a lot of rod-like dichroic dyes have properties for strongly absorbing vibrating light in the mean long axis direction of molecules or have properties for strongly absorbing light in the mean short axis direction which is orthogonal to the long axis. When a layer is formed by arranging molecules of such a rod-like dichroic dye while tilting the long axis thereof relative to the layer plane, the subject layer exhibits not only a high absorption coefficient kx along the x-axis direction as an in-plane direction of the layer plane but a certain absorption coefficient kz in the z-axis direction vertical relative to the layer plane. By utilizing such properties, a polarizing layer whose K falls within the foregoing range can be prepared.

Also, since a lot of disc-like dichroic dyes have such properties that the absorption coefficient of molecules in a disc plane thereof is large, by arranging disc-like dichroic dye molecules in a state in which the disc planes thereof are tilted against the z-axis, and the disc-like molecules are superimposed in the oblique direction thereof while making the disc planes identical with each other, a polarizing layer whose K falls within the foregoing range can be prepared.

By utilizing a guest-host type liquid crystal cell technology, a dichroic dye molecule can be made in the foregoing desired arrangement while accompanying the alignment of a guest liquid crystal. Specifically, the polarizing layer can be prepared by mixing a dichroic dye which will be a guest and a liquid crystal as a host, aligning the host liquid crystal and also aligning a molecule of the dichroic dye along the alignment of the liquid crystal molecule and fixing the alignment state. It is preferred to fix the arrangement of the dichroic dye by forming a chemical bond because the polarizing ability of the polarizing layer does not fluctuate depending upon the use circumstance. For example, the arrangement can be fixed by advancing polymerization of the host liquid crystal, the dichroic dye or a polymerizable component to be added, if desired. A variously proposed technology of a method for preparing a retardation film utilizing a curable liquid crystalline composition can be utilized for this fixing method.

One example of the polarizing layer is a layer formed of a liquid crystalline composition containing at least one kind of liquid crystalline compound having positive optical anisotropy, at least one kind of liquid crystalline compound having negative optical anisotropy, and at least one kind of dichroic dye.

In the description, the term "a liquid crystalline compound having positive optical anisotropy" means any liquid crystalline compound having a principal refractive index larger than other two principal refractive indexes which are assumed to be equal to each other. And examples of such a liquid crystalline compound include rod-like liquid crystalline compounds. On the other hand, in the description, the term "a liquid crystalline compound having negative optical anisotropy" means any liquid crystalline compound having a principal refractive index smaller than other two principal refractive indexes which are assumed to be equal to each other. And examples of such a liquid crystalline compound include discotic liquid crystalline compounds.

Discotic Liquid Crystal Compound:

The discotic liquid crystal compound(s) to be used for preparing the polarizing layer is not limited. Examples of discotic liquid crystals are described in various documents such as C. Destrade et al., Mol. Crysr. Liq. Cryst., vol. 71, page 111 (1981); "Ekisho no Kagaku (Science of Liquid Crystal), edited by the Chemical Society of Japan, Seasonal Chemical Review. No. 22, Chapter 5, and Chapter 10, Section 2 (1994); B. Kohne et al., Angew. Chem. Soc. Chem. Comm., page 1794 (1985); and J. Zhang et al., J. Am. Chem. Soc., vol. 116, page 2655 (1994); and they may be used for preparing the polarizing layer in the invention.

The transferring temperature from the discotic nematic liquid crystal phase to the solid phase is preferably from 70 to 300° C. and more preferably from 70 to 170° C.

In order to immobilize discotic liquid crystalline molecules by polymerization, a polymerizable group has to be bonded as a substituent group to a disk-shaped core of the discotic liquid crystalline molecule. In a preferred compound, the disk-shaped core and the polymerizable group are preferably bonded through a linking group, whereby the aligned state can be maintained in the polymerization reaction. Preferred examples of the discotic liquid crystalline compound having a polymerizable group include the group represented by a formula below.

D(-L-P)$_n$

In the formula, D is a disk-shaped core, L is a divalent liking group, P is a polymerizable group and n is an integer from 4 to 12. Examples of the disk-shaped core D, the divalent linking group (L) and the polymerizable group (P) are (D1)-(D15), (L1)-(L25) and (P1)-(P18) respectively described in JP-A-2001-4837. The content of the publication may be referred for the present invention. The polymerization of discotic liquid-crystal compounds is described in JPA No. hei 8-27284.

Rod-Like Liquid Crystal Compound:

The rod-like liquid crystal compound(s) to be used for preparing the polarizing layer is not limited. Examples of a rod-like liquid crystal compound include azomethines, azoxys, cyanobiphenyls, cyanophenyl esters, benzoate esters, cyclohexane carboxylic acid phenyl esters, cyanophenyl cyclohexanes, cyano-substituted phenyl pyrimidines, alkoxy-substituted phenyl pyrimidines, phenyl dioxanes, tolans and alkenyl cyclohexyl benzonitriles. Not only low-molecular weight liquid crystal compounds but also high-molecular weight liquid crystal compounds may be used. The rod-like liquid crystalline molecules are preferably fixed in an alignment state, and are more preferably fixed by a polymerization reaction. The liquid crystal compounds, having any moiety (moieties) capable of polymerizing or crosslinking under irradiation with an active light, electron ray or heat, are preferable. The number of such a moiety contained in each molecule is preferably from 1 to 6 and more preferably from 1 to 3. Examples of the polymerizable rod-like liquid crystalline compound applicable to the present invention include those described in Makromol. Chem., vol. 190, p. 2255 (1989), Advanced Materials, vol. 5, p. 107 (1993), U.S. Pat. Nos. 4,683,327, 5,622,648 and 5770107, International Patent Publication Nos. WO95/22586, 95/24455, 97/00600, 98/23580 and 98/52905, Japanese Laid-Open Patent Publication "Tokkaihei" Nos. 1-272551, 6-16616, 7-110469, 11-80081 and Japanese Laid-Open Patent Publication "Tokkai" No. 2001-328973.

In the embodiment, the ratio by mass of the rod-like liquid crystal compound to the discotic liquid crystal compound is greater than 0 and less than 1 (preferably from 0.01 to 0.99).

In the polarizing layer satisfying the above mentioned condition, rod-like liquid crystalline molecules may be aligned so that their long axes are substantially parallel to the layer plane; and discotic liquid crystalline molecules may be aligned so that their disk-like planes are substantially vertical to the layer plane. The alignment state may be fixed. More specifically, regarding rod-like liquid crystalline molecules, in the alignment state where their long axes are substantially parallel to the layer plane, the angle between the director of rod-like liquid crystalline molecules and the layer plane is from 0° to 20°. In the alignment state, it is not necessary that rod-like liquid crystalline molecules are aligned homogenously in a strict sense; and as far as the mean tilt angle falls within the range, they may be tilt-aligned with a certain tilt angle or hybrid-aligned with a variable tilt angle. In any alignment state such as homogenous alignment, tilt-alignment and hybrid-alignment, the meant tilt angle of rod-like liquid crystalline molecules is preferably from 0 to 20°, more preferably from 0 to 10°, and even more preferably from 0 to 50. Regarding discotic liquid crystalline molecules, in the alignment state where their disk-like planes are substantially vertical to the layer plane, the mean angle between the disk-like plane of discotic liquid crystalline molecules and the layer plane is from 70° to 90°. As far as the mean angle falls within the range, they may be tilt-aligned with a certain tilt angle or hybrid-aligned with a variable tilt angle. In any alignment state such as homogenous alignment, tilt-alignment and hybrid-alignment, the meant angle is preferably from 70 to 90°, more preferably from 80 to 90°, and even more preferably from 85 to 90°.

In the layer where rod-like and discotic liquid crystalline molecules are aligned in the above mentioned alignment states respectively, molecules of the dichroic dye, which are present in the vicinity of rod-like liquid crystalline molecules, may be aligned so that their long axes are along long axes of rod-like liquid crystalline molecules. In the layer, molecules of the dichroic dye, which are present in the vicinity of discotic liquid crystalline molecules, may be aligned so that their long axes are parallel to the disk-like faces of discotic liquid crystalline molecules, that is, their long axes are vertical to the layer plane. It is possible to prepare the polarizing layer satisfying the required properties by aligning molecules of the dichroic dye in such an alignment state.

The polarizing layer may be prepared as follows.

A composition containing at least one kind of rod-like liquid crystal compound, at least one kind of discotic liquid crystal compound, at least one kind of dichroic dye and if necessary, at least one kind of additive such as polymerization initiator and alignment agent is prepared as a coating liquid. The coating liquid is applied to a surface of a support such as a polymer film, and then dried to align rod-like and discotic liquid crystals and to align the dichroic dye along with the liquid crystals. Then the alignment state is fixed to form a polarizing layer. Examples of the additive such as polymerization initiator and alignment agent which can be used in the invention include those described in JP-A-2007-286330.

In this way, the polarizing layer can be prepared as a monolayer according to a coating method. The thickness of the layer, which is prepared according to the coating method, is preferably from 0.5 to 30 µm, and more preferably from 0.7 to 20 µm.

The liquid crystalline composition which is used for forming the polarizing layer may be a liquid crystalline composition exhibiting any liquid crystal phase of a nematic phase, a smectic A phase, a chiral smectic C phase, an alternating tilted phase (SmCA), an antiferroelectric liquid crystalline phase (SmCA*), a biaxial nematic phase, a biaxial smectic phase and so on. However, as compared with the nematic phase, the smectic phase such as a smectic A phase is high in order, and therefore, it is preferable for use because a polarizing layer with high polarizing ability can be prepared. Preferably, the polarizing layer is prepared by fixing a biaxial liquid crystal phase (preferably biaxial smectic A phase), a chiral smectic C phase, or an antiferroelectric liquid crystalline phase (SmCA*).

Also, an example of the polarizing layer whose K falls within the foregoing range is a polarizing layer including a laminated structure of a first layer containing a dichroic dye arranged while tilting the long axis direction against the layer plane in a first direction and a second layer containing a dichroic dye arranged while tilting the long axis direction against the layer plane in a second direction, with the first and second directions being in a symmetric relation centering on an interface between the first layer and the second layer. For the purposes of aligning the dichroic dye tilted and making the tilt direction thereof have a symmetric relation centering on an interface between the two layers, it is preferred to utilize a liquid crystal compound such that a liquid crystal to be used in combinations can be in the alignment state.

For example, the antiferroelectric liquid crystalline phase (SmCA*) aligns such that spontaneous polarization of every layer constituting the smectic phase mutually offsets and exhibits optical biaxiality as a whole. By utilizing a liquid crystalline composition containing an antiferrodielectric liquid crystal compound and a dichroic dye to form an antiferroelectric liquid crystalline phase, the molecule of the dichroic dye can be arranged in the foregoing state.

In a chiral smectic phase and an alternating tilted phase (SmCA), the tilt direction of every layer constituting the smectic phase is reversed similar to the antiferroelectric liquid crystalline phase, and these liquid crystal phases exhibit optical biaxiality as a whole. Thus, it is also preferred to utilize a liquid crystal compound exhibiting such a liquid crystal phase. That is, it is preferred to form a polarizing layer by converting a liquid crystalline composition containing not only a dichroic dye but a liquid crystal compound capable of being transferred to such a liquid crystal phase into any one of the foregoing liquid crystal phases and then fixing the subject state.

These liquid crystal phases are described in *Ekisho Binran* (Handbook of Liquid Crystals), pages 131 to 132.

When a liquid crystal composition containing at least one kind of liquid crystal compound capable of transferring a biaxial smectic A phase and at least one kind of dichroic dye is prepared and then the composition is allowed to form a biaxial smectic A phase, molecules of the dichroic dye may be aligned along with the liquid crystal. The polarizing layer, satisfying the above mentioned condition, can be obtained by fixing such a state. Examples of the compounds which are capable of forming a biaxial smectic A phase, include formula (NI) shown below.

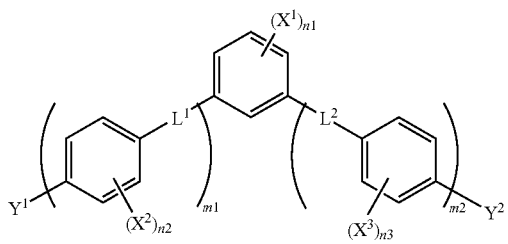

(NI)

In the formula, $X^1$, $X^2$ and $X^3$ each represent a substituent. Examples of the substituent include halogen atoms (such as fluorine, chlorine, bromine and iodine atoms), cyano, nitro, $C_{1-5}$ alkyls, $C_{2-6}$ alkenyls, $C_{2-6}$ alkynyls, $C_{1-6}$ alkyls having at least one halogen atom, $C_{1-6}$ alkoxys, $C_{2-6}$ acyls, $C_{1-6}$ alkylthios, $C_{2-6}$ acyloxys, $C_{2-6}$ alkoxycarbonyls, carbamoyl, $C_{2-6}$ alkyl-substituted carbamoyls, and $C_{2-6}$ acylaminos. Among these, halogen atoms, cayno, $C_{1-5}$ alkyls, $C_{1-6}$ alkyls having at least one halogen atom and $C_{1-6}$ alkoxys are preferable; and halogen atoms, cayno, $C_{1-3}$ alkyls and $C_{1-13}$ alkoxys are more preferable.

In the formula, n1, n2 and n3 each indicate an integer from 0 to 4, and preferably from 0 to 2.

In the formula, $L^1$ and $L^2$ each represent a single bond or a divalent linking group selected from the group consisting of —O—, —C(=O)—, —S—, —N($R^2$)—, —SO$_2$—, —CH$_2$—, —CH=CH—, —CH=N— and —C≡C—. $R^2$ is a hydrogen atom or a $C_{1-5}$ alkyl (preferably methyl).

In the formula, preferably, $L^1$ and $L^2$ each represent a single bond, —O—CO—, —CO—O—, —CO—CH$_2$—, —CH$_2$—CO—, —CO—N($R^2$)—, —N($R^2$)—CO—, —CH=CH—, —CH=N—, —N=CH— or —C≡C—, and more preferably —O—CO—, —CO—O—, —CH=CH— or —C≡C—.

In the formula, m1 and m2 each indicate an integer from 1 to 4, and more preferably an integer from 1 to 3.

In the formula, $Y^1$ and $Y^2$ each represent a halogen atom (such as a fluorine, chlorine, bromine or iodine atom), cyano, nitro, or a $C_{1-15}$ alkyl having at last one polymerizable group. At least one of $Y^1$ and $Y^2$ is a $C_{1-15}$ alkyl having at least one polymerizable group. At least one of the —CH$_2$— portion contained in the $C_{1-15}$ alkyl having at least one polymerizable group may be replaced with —O—, —S—, —C(=O)—, —N($R^2$)—, —CH=CH— or —C≡C—. However, —O— and —O— are never linked to each other directly. $R^2$ represents a hydrogen atom or $C_{1-15}$ alkyl (preferably methyl). And at least one of hydrogen atom in the —CH$_2$— portion contained in the $C_{1-15}$ alkyl having at least one polymerizable group may be replaced with a $C_{1-5}$ alkyl (preferably methyl).

Examples of the polymerizable group include polymerizable ethylenic unsaturated groups and ring-opening polymerizable groups.

Examples of the polymerizable ethylenic unsaturated group include the groups (M-1)-(M-6) shown below.

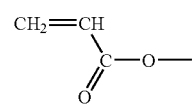
(M-1)

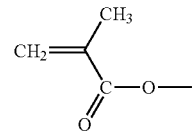
(M-2)

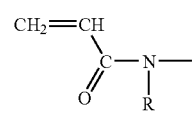
(M-3)

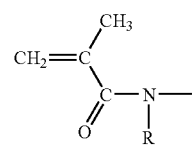
(M-4)

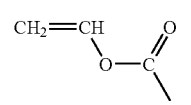
(M-5)

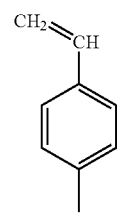
(M-6)

In formulae (M-3) and (M-4), R represents a hydrogen atom or an alkyl, and preferably hydrogen atom or methyl.

Among the above groups, (M-1) and (M-2) are preferable, and (M-1) is more preferable.

As the ring-opening polymerizable group, cyclic ether group is preferable, and epoxy and oxetanyl are more preferable.

Examples of the compound represented by formula (NI) include, but are not limited to, those shown below.

SABA1

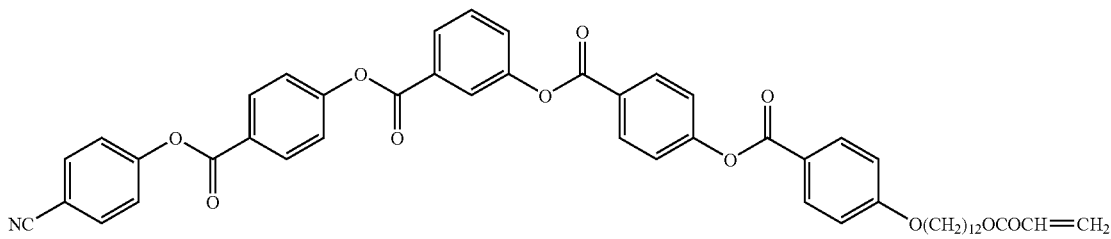

-continued
SABA2
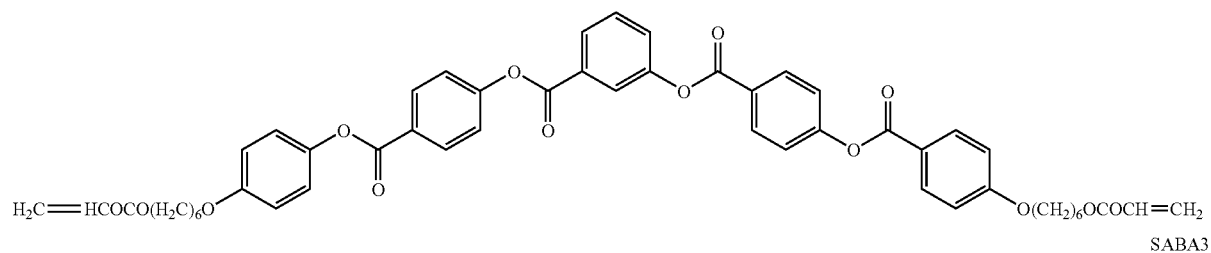
SABA3
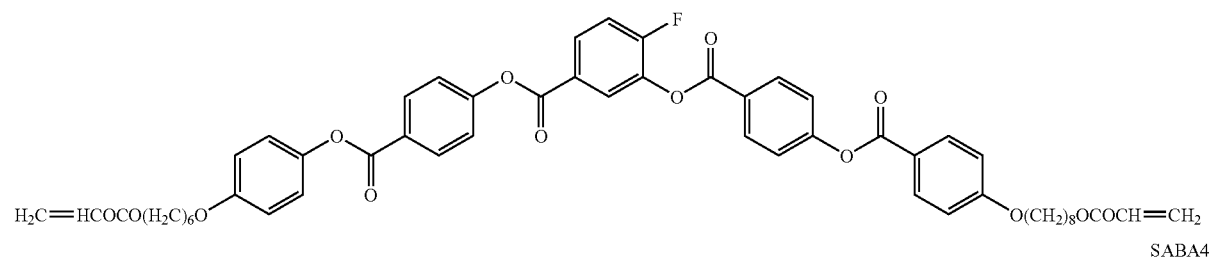
SABA4
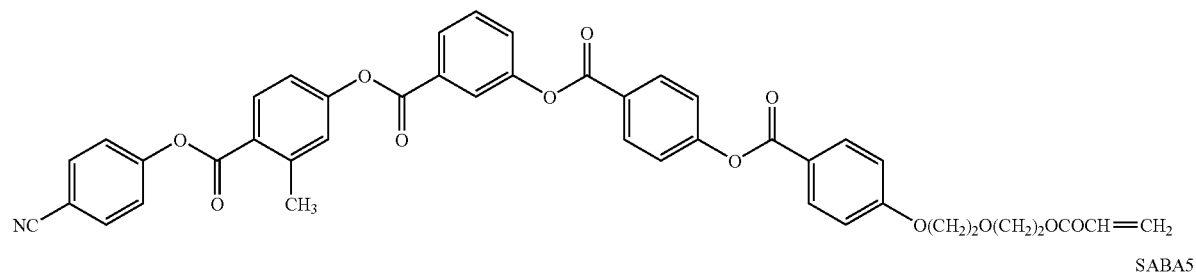
SABA5
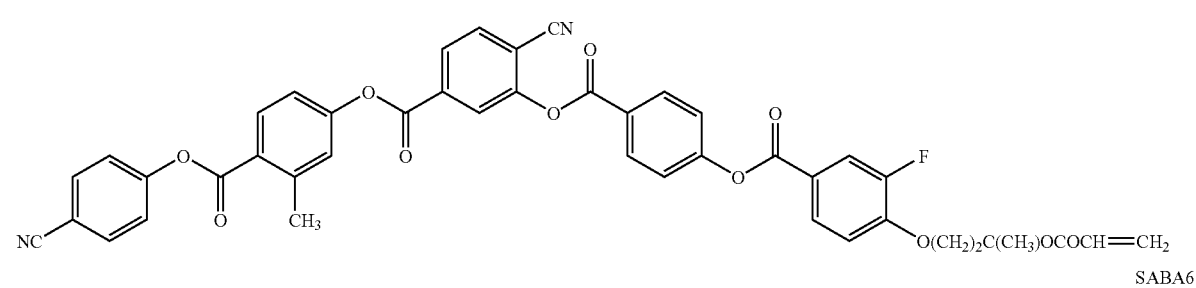
SABA6
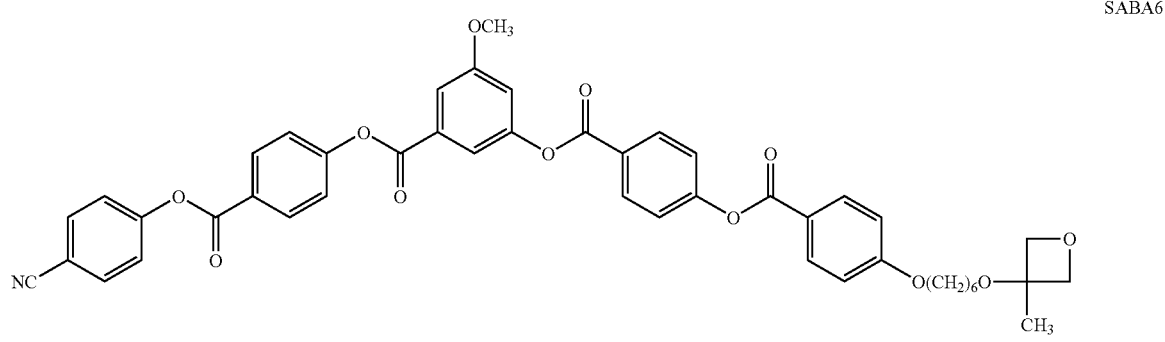
SABA7
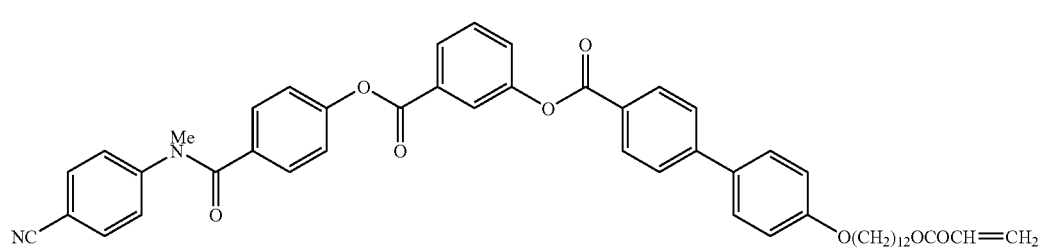

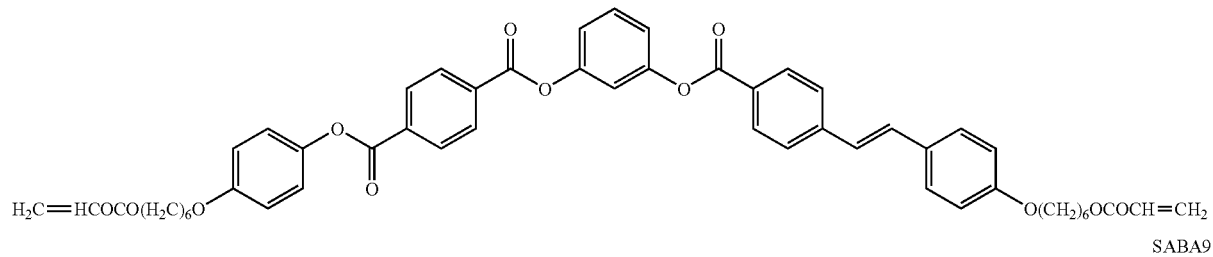
SABA8
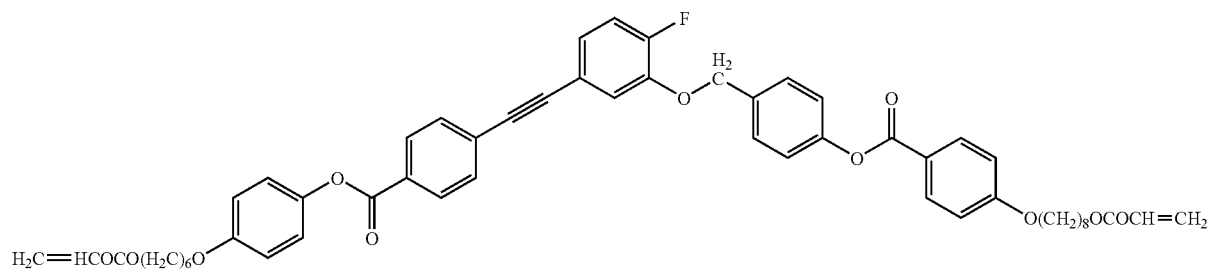
SABA9
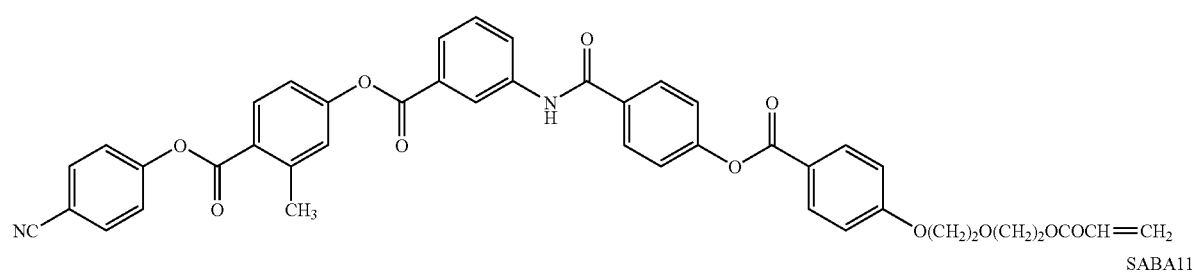
SABA10
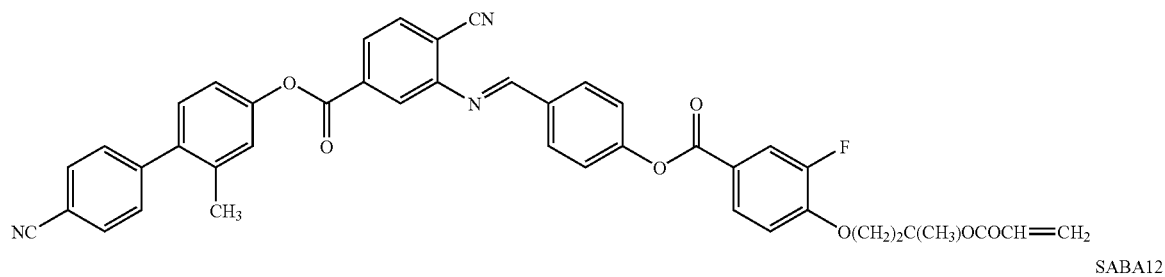
SABA11
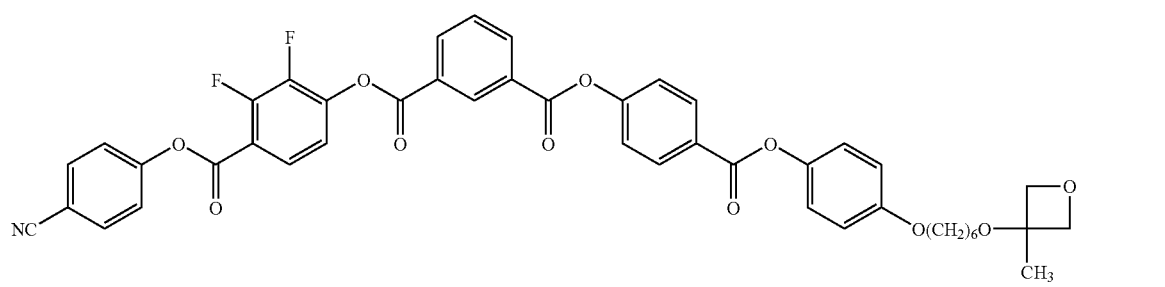
SABA12
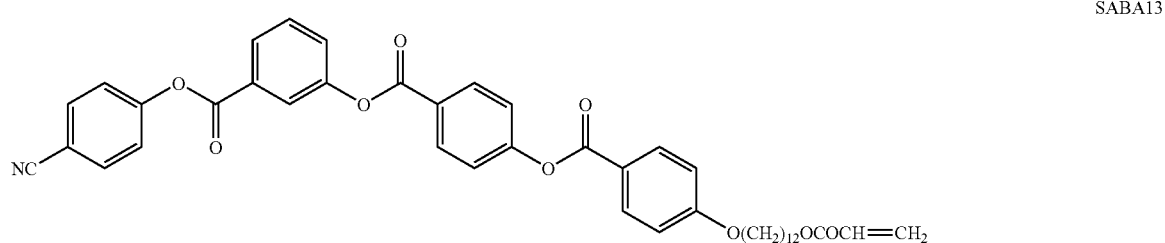
SABA13

-continued

SABA14

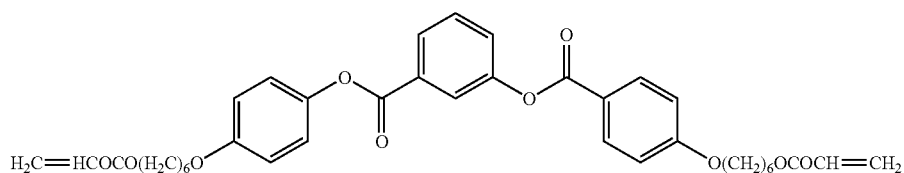

SABA15

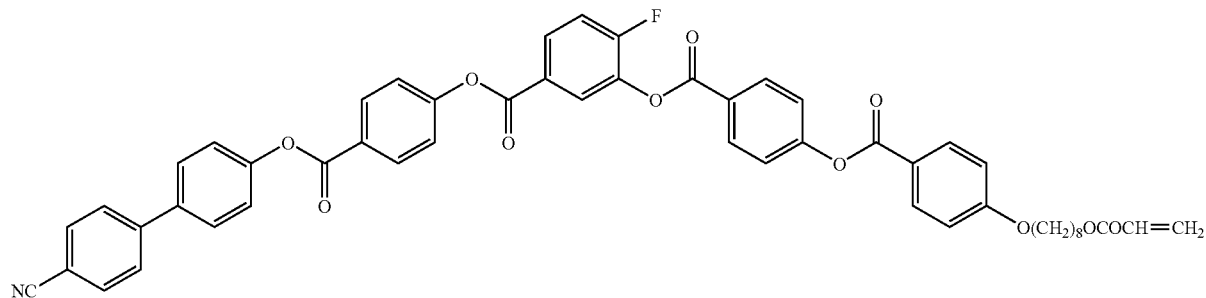

SABA16

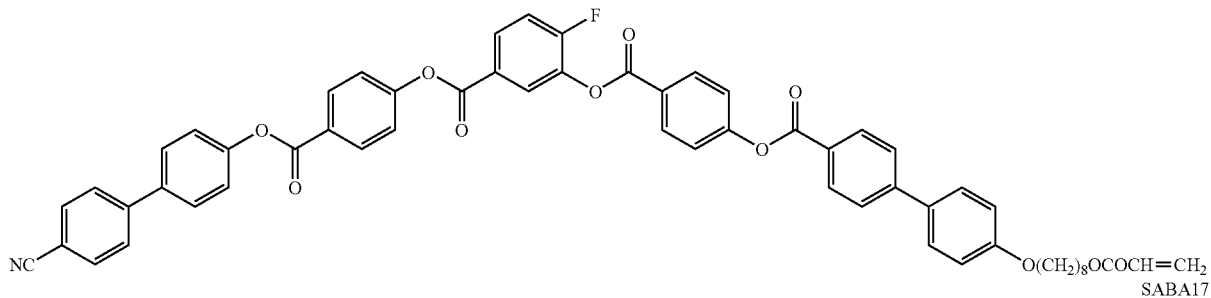

SABA17

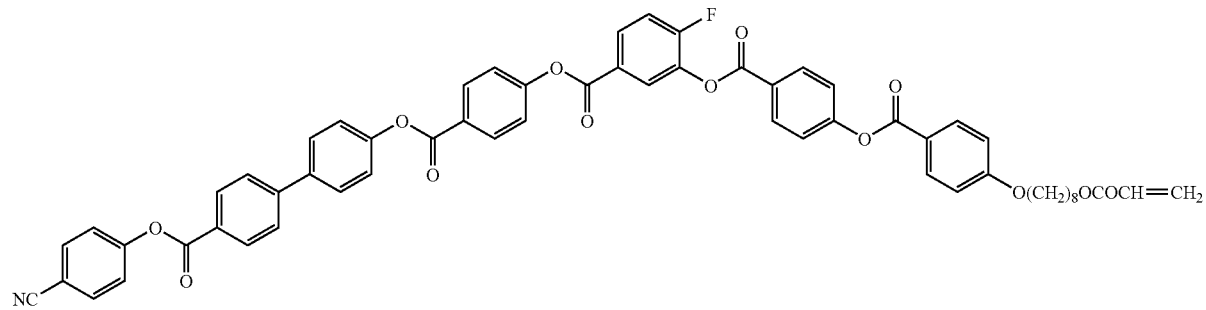

SABA12

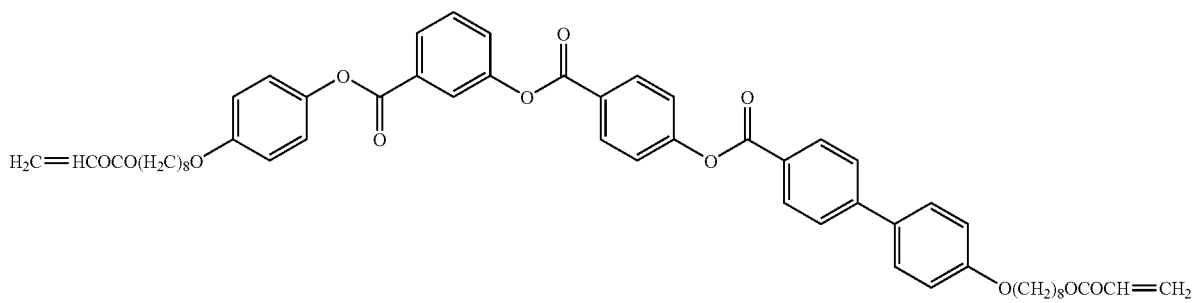

An example of the method for preparing a polarizing layer is as follows.

An alignment layer is first formed on the surface of a support such as a polymer film, if desired, and a liquid crystalline composition containing a dichroic dye is then disposed on the surface of the support (or the surface of the aligned film, if desired), followed by keeping at a liquid crystal phase transition temperature of an antiferroelectric liquid crystalline phase, a chiral smectic phase, a biaxial smectic A phase or the like. The surface of the alignment layer which is formed, if desired may be subjected to a rubbing treatment. Also, for the purpose of aligning molecules of the liquid crystal compound tilted relative to the layer phase at a prescribed tilt angle, it is preferred to add an agent having an action to increase the tilt angle of the liquid crystal molecules (hereinafter referred to as "aligning agent") in the composition. After molecules of the liquid crystal compound are aligned in a desired alignment state, a polymerization reaction of molecules of the liquid crystal compound, molecules of the dichroic dye or molecules of a polymerizable monomer to be occasionally added may be carried out to fix the alignment state and form a polarizing layer. Since this polarizing layer contains a dichroic dye which is arranged tilted relative to the layer plane, it exhibits not only a maximum absorption coefficient kx in the arbitrary x-axis direction within the layer plane but a certain absorption coefficient kz in the z-axis direction which is vertical to the layer plane.

The thickness of the polarizing layer, which is prepared by fixing an alternating tilted phase (SmCA), a chiral smectic C phase or a biaxial liquid crystal phase (preferably a biaxial smectic A phase), is preferably from 0.5 to 30 µm, and more preferably from 0.7 to 20 µm.

According to this method, since K of the polarizing layer fluctuates depending upon the kind and addition amount of the dichroic dye to be used, the kind and addition amount of the liquid crystal compound to be used in combinations, the kind and addition amount of the aligning agent, the alignment temperature, the temperature at the time of polymerization and so on, a polarizing layer having desired K can be prepared by changing at least one of these factors. Also, a polarizing player having a desired K value can be formed in the same manner as in the foregoing method by utilizing an alignment layer having a desired pretilt angle.

Examples of the liquid crystal compound which can be utilized for the foregoing method include compounds disclosed in JP-A-6-18864, JP-A-6-57255, JP-A-6-184123, JP-T-9-504309, JP-A-2002-205974, JP-A-2008-58487, etc.

Examples of the aligning agent which can be used in the invention include oniums disclosed in JP-A-2006-85096, etc. and triazines disclosed in JP-A-2004-279625, etc.

In all of the above described examples, "K" of the polarizing layer may be varied depending on one or more factors such as the type and the amount of the dichroic dye to be used, the type and the amount of the liquid crystalline compound to be used along with the dichroic dye, the type and the amount of the aligning agent to be used occasionally, the alignment temperature and the polymerization temperature. And the polarizing layer having K within the desired range may be prepared by controlling at least one factor selected from them. Using an alignment layer having a desired pretilt angle, the polarizing layer having K within the desired range may be prepared according to the same method as described above.

The method for preparing a polarizing layer is not limited to the foregoing method. For example, a polymer film which is satisfied with characteristics which are required for the polarizing layer will be able to be prepared by penetrating a dichroic dye into a polymer film and arranging the dichroic molecule along the alignment of the polymer molecule in the film. Specifically, the polarizing layer can be prepared by coating a solution of a dichroic dye on the surface of a polymer film to penetrate the dichroic dye into the film. The alignment of the molecule of the dichroic dye can be regulated by the alignment of a polymer chain in the polymer film and properties thereof (for example, chemical and physical properties of the polymer chain or a functional group which the polymer chain has, etc.), the coating method and so on. Details of this method are disclosed in JP-A-2002-90526.

The absorption axis of the dichroic dye contained in the layer may be observed as an average of the absorption axes which are indicated by aggregates, which are formed of dichroic dye molecules and have a size of about a visible light wavelength (hundreds nm). According to the invention, it is preferable that the polarizing layer contains no domain where the aggregates of dichroic dye molecules (having a size of about a visible light wavelength (hundreds nm)) are inclined. When any polarizing layer containing a domain where the aggregates of dichroic dye molecules are inclined is observed in an oblique direction, the observed optical properties may vary depending on the observed direction, for example, depending on whether the oblique direction is along or not along the inclined direction of the aggregates. Thus, such a polarizing layer may lack symmetric properties. According to the above described example, more specifically, the example using the composition containing at least one kind of liquid crystalline compound having positive optical anisotropy and at least one kind of liquid crystalline compound having negative optical anisotropy, in the polarizing layer where rod-like and discotic liquid crystalline molecules are aligned in the above mentioned alignment states respectively, molecules of the dichroic dye, which are present in the vicinity of rod-like liquid crystalline molecules, may be aligned so that their long axes are parallel to the layer plane; and in the polarizing layer, molecules of the dichroic dye, which are present in the vicinity of discotic liquid crystalline molecules, may be aligned so that their long axes are aligned along the plane vertical to the layer plane. Therefore, such a layer may contain no domain where each dichroic dye molecule is inclined and no domain where each aggregate of dye molecules is inclined. According to the example employing a biaxial smectic A phase, the polarizing layer, formed of the fixed biaxial smectic A phase, may contain no domain where each dichroic dye molecule is inclined and no domain where each aggregate of dye molecules is inclined. Thus, these examples may be superior, in terms of symmetric properties, to any examples containing domain where the aggregates of dichroic dye molecules are inclined. And, according to the example employing a chiral smectic C phase or an alternating tilted phase (SmCA*), although the polarizing layer, formed of the fixed chiral smectic C phase or the alternating tilted phase (SmCA*), may contain any domain where each dichroic dye molecule is inclined along liquid crystalline molecules, the polarizing layer may not contain any domain where each aggregate of dye molecules is inclined. Thus, these examples employing a chiral smectic C phase or an alternating tilted phase (SmCA*) may be superior, in terms of symmetric properties, to any examples containing domain where the aggregates (having a size of about a visible light wavelength (hundreds nm)) of dichroic dye molecules are inclined.

As described previously, the polarizing plate of the invention may have a support for supporting the polarizing film and/or a protective film for protecting its surface. As a polymer film which is utilized for such a support or protective film, various polymer films which have hitherto been utilized for supports of an optically compensatory film and protective films of a polarizing plate can be utilized. For example, various polymer films such as cellulose acylate films, cyclic polyolefin based films and polycarbonate based films can be used.

EXAMPLES

The invention is more specifically described below with reference to the following Examples. Materials, reagents, material amounts and proportions, operations and the like can be properly changed so far as the gist of the invention is not deviated. Accordingly, it should not be construed that the scope of the invention is limited to the following Examples.

Example 1

Preparation of Polarizing Plate

A coating liquid for an alignment layer having the following formulation was applied to a triacetyl cellulose film by using a wire bar coater. A film was formed by drying with hot air at 60° C. for 60 seconds and further with hot air at 100° C. for 120 seconds. Subsequently, the film was subjected to a rubbing treatment.

Formulation of Coating Liquid for an Alignment Layer

| Modified polyvinyl alcohol as described below: | 10 parts by mass |
| --- | --- |
| Water: | 371 parts by mass |
| Methanol: | 119 parts by mass |
| Glutaraldehyde: | 0.5 parts by mass |

Modified polyvinyl alcohol

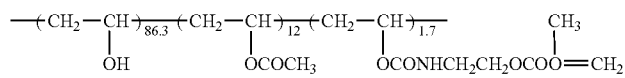

Subsequently, solutions prepared by dissolving 3 parts by mass of a photopolymerization initiator (IRGACURE 819, manufactured by Ciba Specialty Chemicals) and the following aligning agent 1 and aligning agent 2 and the following dye 1 in amounts as shown in Table 1 relative to the following liquid crystal compound 1 (30 parts by mass) and liquid crystal compound 2 (70 parts by mass) in chloroform were prepared, respectively.

Each of these coating solutions was coated on the surface of the foregoing alignment layer by using a wire bar. The resulting film was stuck on a metal frame; heated in a thermostat at 135° C. for one minute; subsequently cooled to 80° C.; irradiated with UV for 15 seconds by a 120 W/cm high pressure mercury vapor lamp to fix the alignment; and then allowed to stand for cooling to room temperature. There were thus formed respective polarizing films.

Liquid crystal compound 1

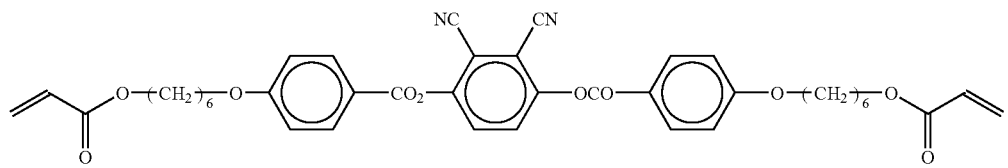

Liquid crystal compound 2

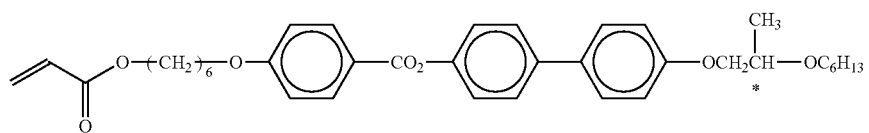

\* represents an asymmetric carbon atom.

Aligning agent 1

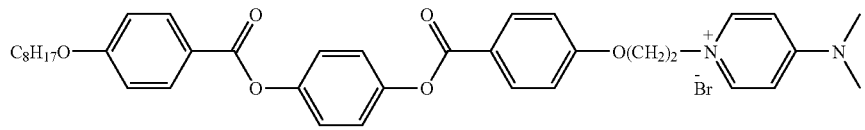

Aligning agent 2

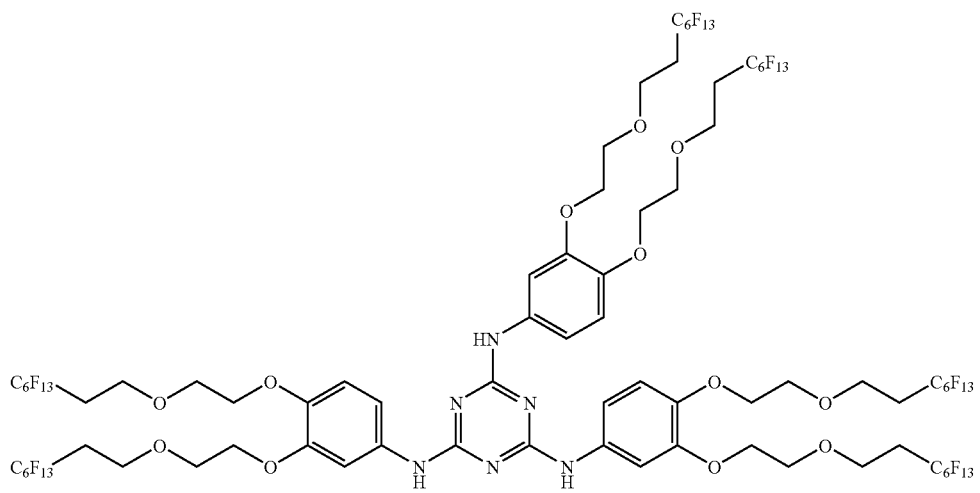

Dye 1
S-344: Black dichroic dye, manufactured by Mitsui Toatsu Chemicals, Inc.

TABLE 1

| | Concentration of additives (Blending parts by mass based on 100 parts by mass of liquid crystal compounds) | | | Film thickness (μm) |
|---|---|---|---|---|
| | Aligning agent 1 | Aligning agent 2 | Dye 1 | |
| Polarizing plate A-1 (Comparison) | 0 | 2 | 2 | 3.5 |
| Polarizing plate A-2 (Comparison) | 0.2 | 1.5 | 2.2 | 3.5 |
| Polarizing plate A-3 (Invention) | 0.4 | 1.2 | 2.4 | 3.5 |
| Polarizing plate A-4 (Invention) | 0.6 | 1.1 | 2.5 | 3.5 |
| Polarizing plate A-5 (Invention) | 0.7 | 1 | 2.6 | 3.5 |
| Polarizing plate A-6 (Comparison) | 1.0 | 1 | 2.9 | 3.5 |

Each of the thus formed polarizing films was measured for single transmittance, parallel transmittance, cross transmittance and angle dependency thereof by using an automatic recording spectrophotometer UV3100 (manufactured by Shimadzu Corporation), thereby determining its absorption coefficients (kx, ky and kz), K and degree of polarization.

| | Absorption coefficient | | | | Degree of polarization (%) |
|---|---|---|---|---|---|
| | kx | Ky | kz | K | |
| Polarizing plate A-1 (Comparison) | 0.143 | 0.001 | 0.001 | 1.00 | 99.998 |
| Polarizing plate A-2 (Comparison) | 0.129 | 0.001 | 0.027 | 0.80 | 99.993 |
| Polarizing plate A-3 (Invention) | 0.117 | 0.001 | 0.048 | 0.60 | 99.982 |
| Polarizing plate A-4 (Invention) | 0.112 | 0.001 | 0.057 | 0.50 | 99.972 |
| Polarizing plate A-5 (Invention) | 0.111 | 0.001 | 0.059 | 0.47 | 99.968 |
| Polarizing plate A-6 (Comparison) | 0.097 | 0.001 | 0.078 | 0.20 | 99.911 |

Example 2

A polarizing plate (B-1) was prepared in the same manner as in Example 1, except for replacing the liquid crystal compounds 1 and 2 by the following liquid crystal compound 3.

The obtained polarizing plate (B-1) was determined for absorption coefficients (kx, ky and kz) in the same manner as in Example 1. As a result, kx=0.118, ky=0.001 and kz=0.049 (K=0.59) were obtained.

Liquid crystal compound 3

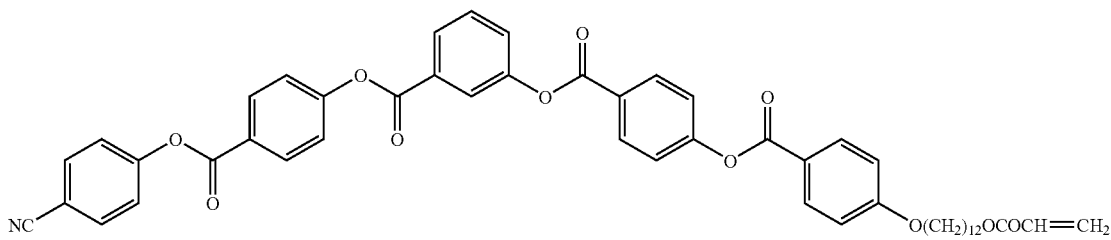

SABA1

Example 3

Polarizing plate C-1 was prepared in the same manner as Example 1, except that the coating liquid having the formulation described below was used as a coating liquid for forming a polarizing layer.

Formulation of Coating Solution for Polarizing Layer

| | |
|---|---|
| Discotic liquid crystal compound shown below | 100 parts by mass |
| Rod-like liquid crystal compound shown below | 50 parts by mass |
| Ethylene oxide-modified trimethylolpropane acrylate (V360, from Osaka Organic Chemical Industry, Ltd.) | 1 part by mass |
| Photo-polymerization initiator ("Irgacure 907", from CIBA-Geigy K.K.) | 3 parts by mass |
| Sensitizer ("Kayacure DETX", from Nippon Kayaku Co., Ltd.) | 1 part by mass |
| Fluoroaliphatic group-containing polymer (A) shown below | 0.1 parts by mass |
| Fluoroaliphatic group-containing polymer (B) shown below | 0.1 parts by mass |
| Pyridinium salt (C) shown below | 0.25 parts by mass |

-continued
| | |
|---|---|
| Dye 1 shown above | 2.5 parts by mass |
| Methanol | 30 parts by mass |
| Methyl ethyl ketone | 165 parts by mass |
Discotic liquid crystal compound
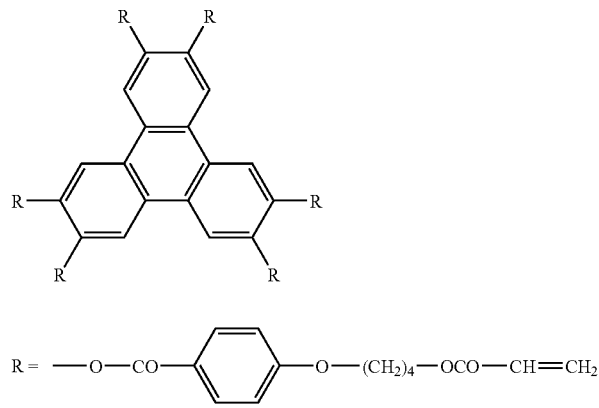
R = —O—CO—⟨C₆H₄⟩—O—(CH₂)₄—OCO—CH=CH₂
Rod-like liquid crystal compound
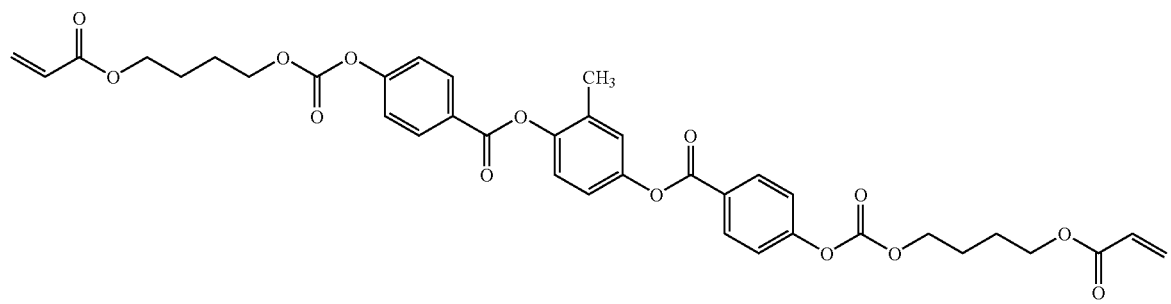
Fluoroaliphatic group-containing polymer (A)
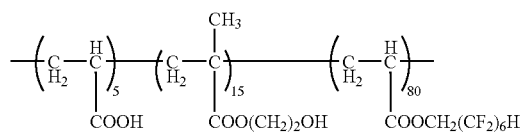
Fluoroaliphatic group-containing polymer (B)
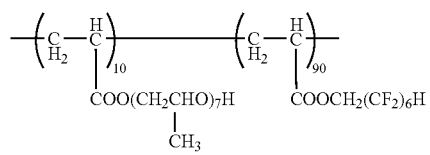
Pyridinium salt (C)
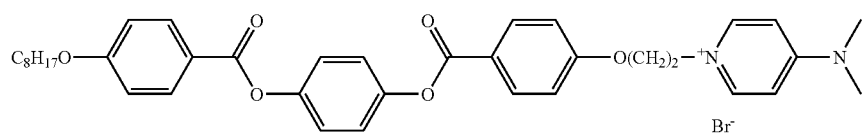

The obtained polarizing plate (C-1) was determined for absorption coefficients (kx, ky and kz) in the same manner as in Example 1. As a result, kx=0.120, ky=0.001 and kz=0.059 (K=0.51, Degree of polarization=99.985%) were obtained.

Example 4

Preparation of Liquid Crystal Display Device

1. Preparation of Optically Compensatory Film
1-1. Formation of Alignment Layer:

The surface of FUJI TAC TD80UF (Re=2 nm, Rth=45 nm) was subjected to a saponification treatment. The saponification treatment was carried out by dipping the foregoing film in a 2.0 N potassium hydroxide solution (at 25° C.) for 2 minutes, neutralizing with sulfuric acid, washing with pure water and then drying. Surface energy of this saponified surface was determined by a contact process. As a result, the surface energy was found to be 63 mN/m. A coating liquid having the following formulation was applied at a coverage of 28 mL/m² to one surface of the saponified film by using a #16 wire bar coated.

Formulation of Coating Liquid for an Alignment Layer

| Modified polyvinyl alcohol as described below: | 20 parts by mass |
| Water: | 361 parts by mass |
| Methanol: | 119 parts by mass |
| Glutaraldehyde (crosslinking agent): | 0.5 parts by mass |

Modified polyvinyl alcohol

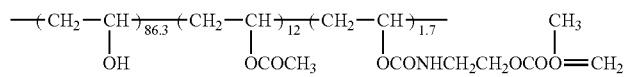

Compound 2
R = O(CH$_2$)$_2$O(CH$_2$)$_2$(CF$_2$)$_6$F

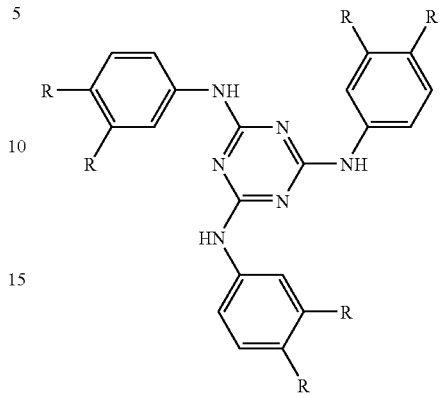

Thereafter, the resulting film was heated for drying in a drying zone at 130° C. for 2 minutes, thereby aligning the Drying was carried out at 25° C. for 60 seconds and then with hot air at 60° C. for 60 seconds and further with hot air at 90° C. for 150 seconds. The alignment layer after drying had a thickness of 1.1 μm.

1-2. Formation of Optically Compensatory Layer:

A discotic liquid crystal-containing coating liquid having the following formulation was applied to the surface of thus prepared alignment layer.

Formulation of Coating Liquid for Discotic Liquid Crystal Layer

| Disc-like liquid crystal compound (1)[*1]: | 32.6% by mass |
| Compound 2 as described below: | 0.15% by mass |
| Ethylene oxide-modified trimethylolpropane triacrylate (V#360, manufactured by Osaka Organic Chemical Industry Ltd.): | 3.2% by mass |
| Sensitizer (KAYA CURE DETX, manufactured by Nippon Kayaku Co., Ltd.): | 0.4% by mass |
| Photopolymerization initiator (IRGACURE 907, manufactured by Ciba-Geigy AG): | 1.1% by mass |
| Methyl ethyl ketone: | 62.0% by mass |

[*1]: As the disc-like liquid crystal compound (1), 1,2,1',2',1'',2''-tris[4,5-di(vinylcarbonyloxybutoxybenzoyloxy)phenylene (Illustrative Compound TE-8-(8)) (m = 4) disclosed in paragraph 0044 of JP-A-8-50206 was used.

disc-like compound. Subsequently, the film was irradiated with UV at 130° C. for 4 seconds by using a 120 W/cm high pressure mercury vapor lamp, thereby polymerizing the disc-like compound. Thereafter, the film was allowed to stand for cooling to room temperature, thereby forming an optically anisotropic layer having a thickness of 3.4 μm on the FUJI TAC TD80UF.

Next, light incident angle dependency of Re as measured by using an automatic birefringence analyzer (KOBRA 21ADH, manufactured by Oji Scientific Instruments), from which was subtracted a contribution of FUJI TAC TD80UF having been previously measured alone, thereby calculating optical characteristics. As a result, it could be confirmed that Re was 0 nm and that Rth was 250 nm. This disc-like liquid crystal compound was horizontally aligned within the range of ±2°.

2. Preparation of Liquid Crystal Cell:

A VA-mode liquid crystal TV ("LC-32 GH5" manufacture by SHARP), and two polarizing plates disposed at the surface side and the rear-face side and any retardation film(s) disposed therein were removed therefrom. And then the liquid crystal cell in the TV was used in the following examples.

The above-prepared polarizing plate A-1, optically compensatory film, liquid crystal cell and polarizing plate A-1 were stuck with an adhesive in this order, thereby preparing a liquid crystal display device 1. This liquid crystal display device displays black at the time of applying no voltage and displays white at the time of applying a voltage of 5 V, respectively.

Similarly, liquid crystal display devices 2, 3, 4, 5, 6, 7 and 8 were prepared by using the polarizing plates A-2, A-3, A-4, A-5, A-6, B-1 and C-1, respectively.

4. Evaluation: Measurement of CR in Off-Axis Oblique Direction:

The crossed Nicols direction of a polarizer was regulated at an azimuth angle of 0 degree and 90 degrees, and a brightness at the time of black display (off-axis black brightness) and a brightness at the time of white display (off-axis white brightness) in a direction at an azimuth angle of 45 degree and a polar angle of 60 degrees were measured, respectively, from which was then calculated a contrast (off-axis CR). The results obtained are shown in the following table.

| Liquid crystal display device | Polarizing plate | K | Off-axis black brightness | Off-axis white brightness | Off-axis CR |
|---|---|---|---|---|---|
| 1 | A-1 | 1.00 | 141.3 | 2107 | 15 |
| 2 | A-2 | 0.80 | 5.6 | 442 | 79 |
| 3 | A-3 | 0.60 | 1.2 | 267 | 230 |
| 4 | A-4 | 0.50 | 0.3 | 165 | 533 |
| 5 | A-5 | 0.47 | 0.5 | 86 | 167 |
| 6 | A-6 | 0.20 | 1.2 | 36 | 31 |
| 7 | B-1 | 0.60 | 1.1 | 252 | 233 |
| 8 | C-1 | 0.51 | 0.3 | 158 | 527 |

Liquid crystal display devices of other modes were also prepared and evaluated in the same manner as described above. As a result, it has been noted that by using a polarizing plate having a K factor of from 0.25 to 0.75, the light leakage in the off-axis direction of the polarizing plate is low and that the viewing angle CR is high.

What is claimed is:

1. A polarizing plate comprising at least a polarizing layer having a K value as defined by the following expression of from 0.25 to 0.75;

$$K=(kx-kz)/(kx-ky)$$

wherein axes which are orthogonal to each other in a plane of the polarizing layer are an x-axis and a y-axis; an axis which is orthogonal to an x-y axis plane is a z-axis; and kx, ky and kz are an absorption coefficient along the x-axis, y-axis and z-axis directions, respectively.

2. The polarizing plate according to claim 1, having a degree of polarization of 99% or more.

3. The polarizing plate according to claim 1, wherein the polarizing layer has kx·d of from 0.1 to 1 μm and kz·d of from 0.02 to 0.8 μm, wherein d represents a thickness of the polarizing layer.

4. The polarizing plate according to claim 1, wherein the polarizing layer is formed of a liquid crystal composition comprising at least one kind of liquid crystalline compound and at least one kind of dichroic dye.

5. The polarizing plate according to claim 1, wherein the polarizing layer formed of a liquid crystalline composition comprising at least one kind of liquid crystalline compound having positive optical anisotropy, at least one kind of liquid crystalline compound having negative optical anisotropy and at least one kind of dichroic dye.

6. The polarizing plate according to claim 5, wherein said at least one kind of liquid crystalline compound having positive optical anisotropy is a rod-like liquid crystalline compound; and said at least one kind of liquid crystalline compound having negative optical anisotropy is a discotic liquid crystalline compound.

7. The polarizing plate according to claim 6, wherein, in the polarizing layer, molecules of the rod-like liquid crystalline compound are fixed so that their long axes are parallel to the layer plane; and, in the polarizing layer, molecules of the discotic liquid crystalline compound are fixed so that their disk planes are vertical to the layer plane.

8. The polarizing plate according to claim 4, wherein the polarizing layer is a layer of a fixed optically biaxial liquid crystalline phase.

9. The polarizing plate according to claim 4, wherein the polarizing layer is a layer of a fixed biaxial smectic liquid crystalline phase.

10. The polarizing plate according to claim 4, wherein the polarizing layer is a layer of a fixed chiral smectic C phase or antiferroelectric liquid crystalline phase (SmCA*).

11. The polarizing plate according to claim 4, wherein the polarizing layer is a single layer of the liquid crystalline composition fixed in an alignment state.

12. The polarizing plate according to claim 10, wherein the liquid crystalline composition comprises an aligning agent capable of increasing a tilt angle of molecules of the liquid crystal compound.

13. A liquid crystal display device comprising at least a liquid crystal cell and the polarizing plate according to claim 1.

* * * * *